(No Model.)
E. T. GILLILAND & F. W. TOPPAN.
ATTACHMENT FOR AUTOMATICALLY OPERATING PHONOGRAPHS.
No. 518,209. Patented Apr. 10, 1894.
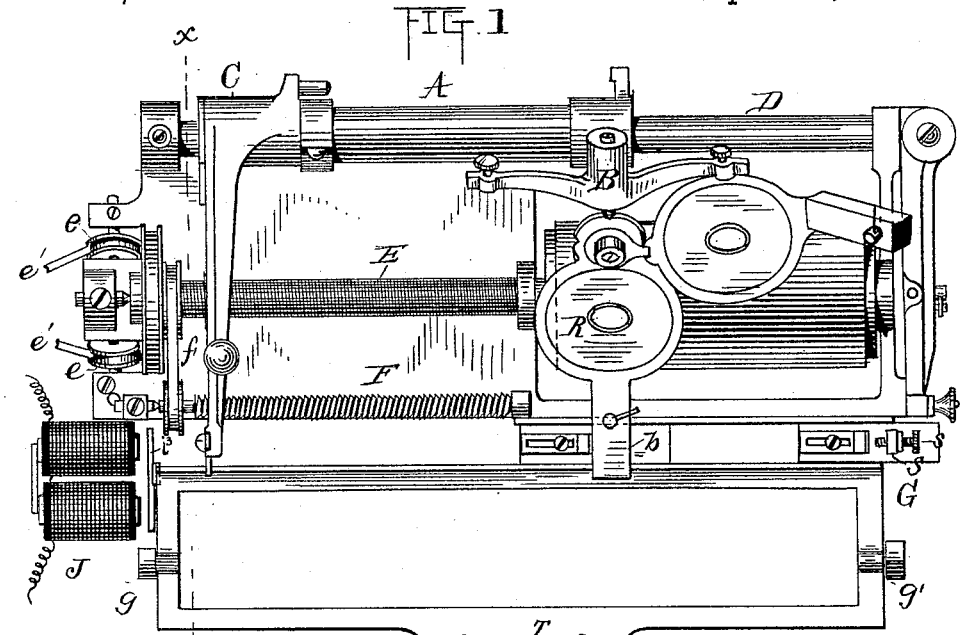
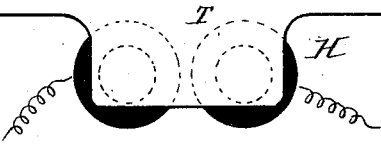
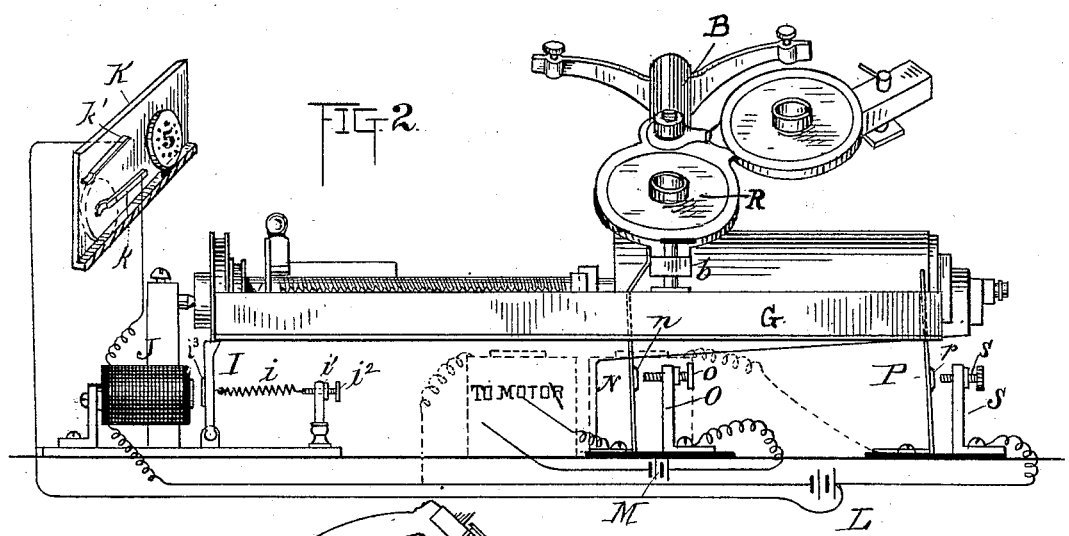
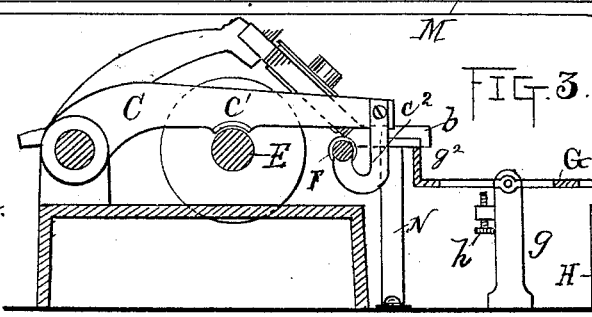
WITNESS:
E. Gatteur.
F. H. Davis
INVENTORS
Ezra T. Gilliland
Frank W. Toppan
BY J. W. Riddle
ATTORNEY
THE NATIONAL LITHOGRAPHING COMPANY,
WASHINGTON, D. C.

UNITED STATES PATENT OFFICE.

EZRA T. GILLILAND AND FRANK W. TOPPAN, OF NEW YORK, N. Y.

ATTACHMENT FOR AUTOMATICALLY OPERATING PHONOGRAPHS.

SPECIFICATION forming part of Letters Patent No. 518,209, dated April 10, 1894.

Application filed March 6, 1890. Serial No. 342,875. (No model.)

*To all whom it may concern:*

Be it known that we, EZRA T. GILLILAND and FRANK W. TOPPAN, of New York city, in the county and State of New York, have invented certain new and useful Improvements in Attachments for Automatically Operating Phonographs, of which the following is a specification.

The object of our invention is to enable phonographs and similar talking machines to be operated automatically, and by means of which the phonograph is adapted to be thrown into operation by the insertion of a piece of money, thereby enabling it to be used after the manner of what are known as vending machines, the coin in its passage closing an electric circuit which, as will be hereinafter explained, starts the phonograph.

We will show and describe our invention as applied to that kind of phonograph which is provided with a left-handed screw of high pitch for moving the spectacle carrying the reproducer of the phonograph backward or returning it to its starting point, after it has finished talking, for the purpose of repeating, although we do not mean to limit our invention to its use with the class of machines shown and described, but we use the word "phonograph" throughout this specification and the claims hereof as a generic term and intend thereby to include all talking machines such as the graphophone and the phonograph-graphophone.

In the accompanying drawings forming a part hereof—Figure 1 is a top view of a phonograph of the class mentioned and of the automatically operating means or mechanism embodying our invention connected therewith. Fig. 2 is a side view in elevation of the means or mechanism embodying our invention; and Fig. 3 is an end view taken through line X—X of Fig. 1.

The phonograph is shown in Fig. 1, and the sleeve A thereof, carrying the spectacle B and the arm C, slides or moves from right to left on the cross-bar or rod D.

E is the right-handed screw-threaded shaft which is connected with the motor or other device that drives the phonograph, and this shaft carries the phonogram on which the record is registered, so that both revolve together; the spectacle B is moved along in one direction when the phonograph is talking by means of this shaft, since the arm C engages with it and while the shaft E revolves the spectacle B is caused to travel in one direction on the cross bar D.

F is the left-handed screw-threaded shaft which returns the spectacle to its original position after the phonograph has finished talking and with which shaft the arm C is also adapted to engage.

The construction and shape of the arm C is shown in Fig. 3, that is, it is screw-threaded at $c'$ on its under side and this screw-threaded portion meshes with the shaft E to move the spectacle B in one direction, that is, so that the phonograph may operate or talk; but, of course, as will be readily understood, the arm C is not at the same time in contact with the shaft F which, as before stated, is for the purpose of returning the spectacle to its starting point, although these shafts revolve together, being connected by the belt $f$.

In order to move the spectacle backward the reproducing point must be raised from off the phonogram so as not to destroy the record registered upon it, and the arm C must also be raised from contact with the shaft E, and this raising of the arm C causes it to come in contact with the under side of the shaft F and to be returned thereby, that is, by means of the downwardly projecting curved plate $c^2$ connected with the outer end of the arm C (see Fig. 3), which plate is in the form of a knife edge on its upper edge and engages with the shaft F on its under side, which in revolving forces back the spectacle B, since this plate $c^2$ will be made to travel, as it were, in the thread of the shaft F. Thus, when the arm C is down, as also the spectacle in position for talking, it rests upon the shaft E to be moved along thereby, but the plate $c^2$ is not then in contact with the under side of the shaft F, but is down below it; and when the arm C is up, as also the spectacle, the plate $c^2$ will then be in contact with the under side of the shaft F and be moved backward thereby as explained. This raising and lowering of the spectacle has been done heretofore by the operator, but it is part of our invention to accomplish this by means of electro-magnets.

G is a rocking-bar hung or pivoted on the posts $g$ $g'$ and the inner side of this rocking-bar has a projection $g^2$ extending its entire length, upon which rests an arm or projection $b$ forming part of the reproducer R; the outer side of this rocking-bar carries a projection T which is adapted to be operated upon by electro-magnets H.

To prevent the inner side of the rocking-bar from falling too far and thereby raising the outer side out of reach of, or to too great a distance to be operated upon by the magnet H a screw $h$ or stop is connected with one of the posts $g$ upon which the rocking bar rests or is pivoted and against which stop the bar G strikes in falling and is thereby prevented from dropping too far.

I is a bar pivoted at its bottom to the attachment and upon which bar the inner side of the rocking-bar G rests when the machine is not talking, thereby holding up that side of the rocking-bar G and also holding up the spectacle B and reproducer R, forming part of it, from contact with the phonogram, since the projection $b$ of the reproducer R is in direct contact with this inner side of the rocking-bar G, and when this side of the rocking-bar G is up it holds the reproducer R up, as will be readily understood.

To one side of the bar I is attached a spring $i$, the other end of which spring being connected with a post $i'$ or directly to a screw $i^2$ which passes through the post $i'$ for the purpose of regulating the tension of this spring, and this tension is to the right, as shown in the drawings, and against the power of an electro-magnet J which in its active condition operates upon the bar I through the armature $i^3$ thereon.

K is a portion of the box or receptacle into which the piece of money is dropped, and this coin travels on an incline, as shown, and if of the proper size comes in contact with both the metal contacts $k$ $k'$ which are in circuit with the magnet J and a battery L, and this circuit remains normally broken at the point between the contacts $k$ $k'$ but is closed for a moment by the coin which in its passage touches both contacts, thereby closing the circuit to the battery L and magnet J, energizing this magnet which will then attract the armature $i^3$ on the bar I, drawing it to the left, as shown in the drawings, from under the rocking-bar G thereby enabling the inside edge of this rocking-bar to fall and with it the spectacle, lowering the reproducer R into position on the phonogram for talking; but this is only for an instant, since the coin only closes the circuit to the battery L and the magnet J in passing between the contacts $k$ $k'$ and as soon as it is gone by them the circuit is again broken and the magnet J de-energized; but the bar I cannot be drawn to the right again by the spring $i$, since the inner edge of the rocking-bar G is down, and against the end of this rocking-bar the bar I rests until the rocking-bar is subsequently raised as will be presently explained. Almost at the same moment that the rocking-bar G has stopped or is down and the reproducer is in position for talking, the phonograph will begin to operate, since the rocking-bar or the spectacle in lowering has closed the circuit to the battery M and the motor (not shown) which drive the phonograph by means of a circuit-closing device which it operates and which we will now explain.

N is a strip of spring steel carrying an armature $n$ and which is fastened at its lower end to the bottom of the attachment (see Fig. 2) and is insulated therefrom. The upper end of this spring is bent, as shown, and is in direct contact with the projection $b$ of the reproducer R and is held back thereby from contact with a screw $o$.

O is a post also insulated from the base of the attachment and carries on its upper end an adjustable screw $o$ with which the armature $n$ on the spring N makes contact. The post O is in circuit with the battery M (or the motor circuit) from which battery the current runs to the motor that drives the phonograph, and the spring N is also in this same circuit, the circuit being from the battery M to the motor, from the motor to the spring N, and when the armature $n$ is in contact with the screw $o$ to the post O and back to the battery. A similar circuit-closing device consisting of the spring P carrying an armature $p$ is also connected with the base of the attachment and insulated therefrom, and there is also located near this spring a post S also attached to but insulated from the base of the attachment, through which post passes an adjustable screw $s$ which is adapted to come in contact with the armature $p$ on the spring P and close an electric circuit which runs from the battery L to the magnets H and therefrom to the spring P to the post S and back again to the battery.

To return now to the point where the coin in passing between the contacts $k$ $k'$ has closed the circuit from the battery L to the magnet J to trip the bar I and lower the inner edge of the rocking-bar G and with it the spectacle and reproducer into position for talking, the arm C will then rest upon the screw-threaded shaft E which is connected with the motor by the pulleys $e$ and belts $e'$; and in falling the projection $b$ on the reproducer R drops below the inwardly extending upper end of the spring N which thereby is enabled to move or moves itself to the right, and comes in contact with the screw $o$ on the post O, thereby closing the circuit from the battery M to the motor which begins to run, revolving the shaft E, carrying along the arm C, and the phonograph will begin to operate or to talk and continue to talk until the spectacle strikes the spring P, which is made adjustable to the right or to the left according as to how much of the record registered upon the phonogram is desired shall be heard, forcing it in contact with the screw $s$ on the post S, thereby closing the circuit to the battery L and the magnets H, which are thereby energized and attract or draw down the projection T on the opposite or other edge of the rocking-bar G, lowering that side of the rocking-bar and raising the inner side of the rocking-bar and with it the reproducer from contact with the phonogram, and the phonograph has ceased to talk; at the same moment the rod I is drawn into position by the spring $i$ under the rocking-bar G and holds it there in position until it is drawn away again by the subsequent insertion of another coin, which closes the circuit to the battery L and magnet J, as before explained. But the motor has not stopped, since the circuit is still closed from the battery M to the motor because the armature $n$ on the spring N is still in contact with the screw $o$ on the post O, for, although the phonograph has ceased talking, the spectacle and reproducer must be returned to their original position; and this is accomplished by the screw-threaded shaft F which has also been revolving with the screw-threaded shaft E, being connected therewith by the belt $f$; but, as will be readily understood, and as before explained, when the spectacle has been raised by the rocking-bar G it has also raised the arm C from off the shaft E, and at the same time lifted the plate $c^2$ in contact with the under side of the shaft F, which is screw-threaded in the opposite direction from the shaft E for the purpose of returning the spectacle. As soon as the spectacle has commenced to return the spring P is thereby removed from the screw $s$ and the circuit from the battery L to the magnets H is then broken, for those magnets have finished their work having drawn down one side of the rocking-bar G and at the same time lifted up the spectacle; and when the projections $b$ on the reproducer R of the spectacle has reached in its backward travel the inwardly extending end of the spring N it forces it back, removing the armature $n$ from contact with the screw $o$ on the post O and thereby breaks the circuit from the battery M to the motor which then ceases to run and stops the phonograph, and all the parts are once more in position ready for the insertion of another coin. Thus, as will be seen, there are three circuits: one (which is closed by the passage of the coin) from the battery L to the magnet J and back to the battery L for the purpose of tripping the rod I to lower the spectacle; another running from the battery M to the motor that drives the phonograph, therefrom to the spring N, post O and back to the battery M; and another which runs from the battery L to the magnets H and therefrom to the spring P and post S and back to the battery L for the purpose of raising the spectacle to stop the talking and enable the spectacle to be returned. Thus it will be seen that, by our invention, instead of the spectacle being controlled and operated by the operator, it is controlled and operated by an electromagnet, that is, instead of being raised and lowered by the operator, it is raised and lowered by an electro-magnet.

Heretofore the rocking-bar has been a part of the phonograph and was capable of taking three positions through the medium of a cam: when lowered, the reproducer was brought in contact with the phonogram into position ready for talking; when raised one half of the distance of which it is capable of moving the reproducer, was raised from off the phonogram and the arm C raised out of the thread of the shaft E suspending the talking; and when it was desired to repeat or go backward, the arm was raised to the highest point which brought the left-handed or reverse screw F into action. In our invention, the rocking-bar is capable of taking only two positions; but this, however, serves the purpose of our invention, since we only require two positions of the phonograph spectacle and the arm C, that is, the spectacle should either be down in position for talking, or up bringing into action the reverse motion for returning it to the starting point.

As will be readily understood, to enable the phonograph or other similar talking machines to be operated automatically, there are four actions or operations which must be produced at the proper times: first, the lowering of the spectacle arm to bring the reproducer into position for talking; second, the closing of the circuit to the motor; third, raising the spectacle so that it may be returned to its starting point after the phonograph has produced the desired amount of talking; and fourth, opening the motor circuit to stop the phonograph. These operations being the objects of our invention to accomplish, we have shown and described a mechanism or means embodying our invention which effectually accomplishes these desired results.

A dash-pot or other similar device may be attached to the rocking-bar or lifting arm to prevent a jar when the bar is dropped and prevent injury to the phonogram or a disturbance of the attachment of the reproducer; and we may also attach to the spectacle arm a counter-balance in order that the electro-magnets operating the lifting device may raise the arm without difficulty, this counter-balance also preventing the jar produced by the lowering of the spectacle arm.

The circuit-closing devices which close the circuits, before and for the purposes set forth, are adjustable in respect to the point at which they are brought into action in order to start or stop the phonograph at any point on the phonogram according as to how much of the record registered upon it it is desired shall be heard; and while the circuit closing devices shown and described are effectual for the purposes desired yet we do not intend to limit our invention to the use of these particular circuit closing devices since there are many circuit closing devices which could be employed for the purposes desired, the use of any of which would be covered by our invention.

The circuit operating the starting device or rocking-bar can be arranged to be closed by the spectacle when traveling in the reverse or return motion at any point in its backward travel by means of an adjustable circuit-closing device to lower the spectacle into position for talking, so as to automatically repeat the talking as often as desired without the insertion of another coin, as will be readily understood.

Although we prefer to use a supplementary battery L for connecting or operating the rocking-bar through the medium of the electro-magnets J and H, but as each of these magnets call upon the battery to act for an instant only, we can utilize the phonograph or motor battery for these purposes without the supplementary battery if desired.

What we claim as our invention is—

1. The combination, with a phonograph and an electric circuit which supplies power to operate said phonograph, of an attachment or device to hold the spectacle and reproducer from contact with the phonogram when the phonograph is not talking, an electro-magnet in a circuit adapted to operate on said device or attachment to lower the spectacle and reproducer into position for talking, and a coin to close the circuit to the source of electric energy and said magnet, substantially as and for the purpose set forth.

2. The combination, with a phonograph and an electric circuit which supplies power to operate said phonograph, of an attachment or device to hold the spectacle and reproducer from contact with the phonogram when the phonograph is not talking, an electro-magnet in a circuit adapted to operate on said device or attachment to lower the spectacle and reproducer into position for talking a coin to close the circuit to the source of electric energy and said magnet and another electro-magnet in a circuit which is also adapted to operate on said device to raise said spectacle and reproducer at any desired point in their travel according as to how much of the record registered on the phonogram it is desired shall be heard, substantially as and for the purpose set forth.

3. The combination with a phonograph and an electric circuit which supplies power to operate said phonograph, of an attachment or device to hold the spectacle and reproducer from contact with the phonogram when the phonograph is not talking, an electric circuit from a separate source of electric energy, an electro-magnet in circuit with said separate source of electric energy adapted to operate on said attachment or device to lower the spectacle and reproducer into position for talking and at the same time close the said motor circuit so that the phonograph may operate or talk, and a coin to close the circuit to said separate source of electric energy, substantially as and for the purpose set forth.

4. The combination with a phonograph and an electric circuit which supplies power to operate said phonograph, an attachment or device to hold the spectacle and reproducer from contact with the phonogram when the phonograph is not talking, an electric circuit from a separate source of electric energy, an electro-magnet in circuit with said separate source of electric energy adapted to operate on said attachment or device to lower the spectacle and reproducer into position for talking and at the same time close the said motor circuit so that the phonograph may operate or talk, and a coin to close the circuit to said separate source of electric energy, and another electro-magnet in circuit with said separate source of electric energy which is also adapted to operate on said attachment or device to raise the spectacle and reproducer at any desired point in their travel according as to how much of the record registered on the phonogram it is desired shall be heard, substantially as and for the purpose set forth.

5. The combination with a phonograph driven by a motor, of an attachment to normally hold the spectacle and reproducer from contact with the phonogram, an electro magnet to operate on said attachment to lower the spectacle and reproducer into position for talking, the electrical circuit operating said magnet being normally open and being closed by a coin, an adjustable circuit closing device which is operated by the spectacle and reproducer in lowering to close the circuit to the motor, and is operated by the spectacle and reproducer in returning to its normal condition to open the said circuit, an electro magnet operating on said attachment to raise the spectacle and reproducer, and an adjustable circuit closing device which is included in the circuit with the last named electro magnet and is actuated by the spectacle and reproducer at any desired point in their forward travel, substantially as described.

6. The combination with a phonograph of an attachment or device to normally hold the spectacle and reproducer from contact with the phonogram, an electro-magnet adapted to operate on said device or attachment to lower the reproducer into position for talking, and at the same time to close the circuit to the motor that drives the phonograph, the electric circuit operating said magnet being normally open and adapted to be closed by means of a coin, and an electro-magnet which also operates on said attachment or device to raise the spectacle and reproducer at any desired point in its travel, according as to how much of the record on the phonogram it is desired shall be heard, substantially as and for the purpose set forth.

7. The combination with a phonograph of an attachment or device to normally hold the spectacle and reproducer from contact with the phonogram, said attachment or device being adapted to be operated upon by an electro-magnet to lower the reproducer into position for talking and at the same time to close the circuit to the motor that drives the phonograph, the electric circuit operating said magnet being normally open and adapted to be closed by means of a coin and an electro-magnet which also operates on said attachment or device to raise the spectacle and reproducer at any desired point in its travel, according as to how much of the record on the phonogram it is desired shall be heard, so that it may be returned to its starting point, and an adjustable circuit-closing device adapted to be operated at any desired point of the return of the phonograph to open the motor circuit and stop the phonograph, substantially as and for the purpose set forth.

8. The combination with a phonograph of an attachment or device to normally hold the spectacle and reproducer from contact with the phonogram when the phonograph is not talking an electro-magnet adapted to operate on said attachment or device to lower the spectacle and reproducer, and at the same time to close the circuit to the motor that drives the phonograph, the electric circuit operating said magnet being normally open and adapted to be closed by means of a coin, substantially as and for the purpose set forth.

9. The combination, with a phonograph driven by an electric motor, of an electrically operated attachment for raising and lowering the spectacle and reproducer, an electro magnet operating on said attachment to release and lower it and to thereby lower the spectacle and reproducer and simultaneously close the motor circuit, the circuit of the said motor being normally open and being closed by a coin, an electro magnet operating on said attachment to raise the reproducer and spectacle, an adjustable circuit closing device which is included in circuit with the last named electro magnet, and is actuated by the spectacle and reproducer at any desired point in their forward travel, and an adjustable circuit breaking device operated at any desired point of the rearward travel of the spectacle and reproducer to open the motor circuit, substantially as described.

10. The combination with a phonograph, the reproducer thereof having a projection $b$, of the rocking-bar G, bar I, the adjustable spring $i$, electro-magnet J, battery L and contacts $k\ k'$ in circuit with said battery L and magnet J, all constructed, arranged and adapted to operate by means of a coin, substantially as and for the purpose herein described.

11. The combination with a phonograph, the reproducer thereof having a projection $b$, of the rocking-bar G, bar I, the adjustable spring $i$, electro-magnet J, battery L, contacts $k\ k'$ in circuit with said battery L and magnet J, the adjustable circuit-closing device consisting of the spring N, post O, and screw $o$, battery M and an electric motor for driving said phonograph in circuit with said battery M and circuit-closing device, all constructed, arranged and adapted to be thrown into operation by means of a coin, substantially as and for the purpose herein described.

12. The combination with a phonograph, the reproducer thereof having a projection $b$, of the rocking-bar G, bar I, the adjustable spring $i$, electro-magnet J, battery L, contacts $k\ k'$ in circuit with said battery L and magnet J, the adjustable circuit-closing device consisting of the spring N, post O, and screw $o$, battery M, and an electric motor for driving said phonograph in circuit with said battery M and circuit-closing device, and an adjustable circuit closing device consisting of the spring P, post S and screw $s$ in circuit with the battery L, and magnet H, all constructed, arranged and adapted to operate, substantially as and for the purpose herein described.

This specification signed and witnessed this 1st day of February, 1890.

EZRA T. GILLILAND.
FRANK W. TOPPAN.

In presence of—
A. W. KIDDLE,
FREDERICK H. DAVIS.